(12) United States Patent
Ferren et al.

(10) Patent No.: US 8,149,508 B2
(45) Date of Patent: Apr. 3, 2012

(54) SYSTEM FOR PROVIDING AN ENHANCED IMMERSIVE DISPLAY ENVIRONMENT

(75) Inventors: Bran Ferren, Beverly Hills, CA (US); Douglas B. Schwartz, Los Angeles, CA (US)

(73) Assignee: Applied Minds, LLC, Glendale, CA (US)

( * ) Notice: Subject to any disclaimer, the term of this patent is extended or adjusted under 35 U.S.C. 154(b) by 0 days.

(21) Appl. No.: 12/941,665

(22) Filed: Nov. 8, 2010

(65) Prior Publication Data

US 2011/0157694 A1    Jun. 30, 2011

Related U.S. Application Data

(60) Provisional application No. 61/258,974, filed on Nov. 6, 2009.

(51) Int. Cl.
*G03B 21/32* (2006.01)
(52) U.S. Cl. .......... 359/445; 359/444; 359/446
(58) Field of Classification Search .......... 359/443, 359/445–446
See application file for complete search history.

(56) References Cited

U.S. PATENT DOCUMENTS

| | | | | |
|---|---|---|---|---|
| 2,245,896 A | * | 6/1941 | Bodde | 359/445 |
| 2,274,501 A | * | 2/1942 | Parrett | 359/445 |
| 4,155,967 A | * | 5/1979 | South et al. | 264/32 |
| 4,478,902 A | * | 10/1984 | Tsuzuku et al. | 428/174 |
| 5,097,640 A | * | 3/1992 | Skolnick et al. | 52/81.3 |
| 6,871,961 B2 | * | 3/2005 | Balu et al. | 353/94 |
| 7,453,633 B2 | * | 11/2008 | Hopper et al. | 359/451 |
| 7,777,947 B2 | * | 8/2010 | Congard et al. | 359/445 |
| 2006/0274413 A1 | * | 12/2006 | Hopper et al. | 359/451 |
| 2010/0300006 A1 | * | 12/2010 | Magpuri | 52/8 |

* cited by examiner

*Primary Examiner* — Clayton E Laballe
*Assistant Examiner* — Kevin Butler
(74) *Attorney, Agent, or Firm* — Michael A. Glenn; Glenn Patent Group (57) ABSTRACT

An immersive dome includes a number of novel features designed to enhance the performance of the immersive dome over presently-known immersive dome environments. Projectors are mounted in a multi-tier tower, out of sight beneath a viewing platform positioned to provide optimal wrap-around viewing. The projection surface consists of open-cell foam that allows passage of behind-surface sound into the dome while allowing unwanted ambient noise within the dome to escape. A visually-reflective coating, in conjunction with the open cell structure, provides a textured surface that acts as a micro-baffle and suppresses cross-reflection of projected imagery.

21 Claims, 10 Drawing Sheets

SYSTEM FOR PROVIDING AN ENHANCED IMMERSIVE DISPLAY ENVIRONMENT

CROSS REFERENCE TO RELATED APPLICATIONS

This application claims benefit of U.S. provisional patent application ser. no. 61/258,974, filed Nov. 6, 2009, and is related to U.S. patent application Ser. No. 12/939,886, filed Nov. 4, 2010, both of which applications are incorporated herein in their entireties by this reference thereto.

GOVERNMENT LICENSE RIGHTS

This invention was made with government support under contract no. FA9453-06-D-0103/0004, awarded by the United States Air Force. The government has certain rights in the invention.

BACKGROUND

1. Technical Field

The invention relates to immersive display of high-resolution imagery. More particularly, the invention relates to a system and method for providing an enhanced immersive display environment.

2. Description Of Related Art

Immersive domes provide a visual environment offering seamless realism, wrapping imagery around the viewer's peripheral vision. These environments are useful for entertainment and for rapidly assimilating large amounts of visual information, such as in a command center.

Domes may have a single projector equipped with a fisheye lens or may integrate multiple projectors to provide higher resolution. In those domes equipped with multiple projectors, blending and warping software is typically used to give the impression of a single, seamless image. Although rear projection provides adequate resolution and coverage, it is impractical for large domes, because of interference from the dome support structure and excessive space requirements.

Several variations of immersive domes exist. In one well-known variation, the projector is placed in the plane of a canted auditorium floor. In another common variation, a cluster of projectors is hung from the top of the dome above the viewer. While the latter arrangement permits the viewer free movement on the floor below, it also blocks viewing of the portion of the dome directly overhead.

A disadvantage posed by the projection surfaces of immersive domes is that imagery projected on one portion of the surface can reflect onto another portion, causing visual interference such as washout. In essence, the spherical surface acts as an integrating sphere, diffusing light and lowering contrast.

Effective presentation of sound in an immersive environment is almost as important as presentation of visual information. However, domes present unique acoustic problems not encountered with flat or near-flat surfaces. For example, if the viewing surface is acoustically reflective, any sound made by viewers within the dome is reflected, causing echo and reverberation and impairing intelligibility. In fact, any sound within the dome, no matter the origin, may be cross-reflected, diffusing the origin point and thus reducing sound quality and directionality. Perforated domes attempt to alleviate this issue by allowing some sound to exit the surface to the outside, but much sound is still reflected. Additionally, the perforations can compromise screen reflectivity and, therefore, image brightness and may be visible to the viewer, especially on smaller domes with relatively close viewing distances.

SUMMARY

A system for providing an enhanced immersive display environment includes a number of novel features designed to enhance the performance of an immersive dome over presently-known immersive dome environments. Projectors are mounted in a multi-tier tower, out of sight beneath a viewing platform positioned to provide optimal wrap-around viewing. The projection surface consists of open-cell foam that allows passage of behind-surface sound into the dome while allowing unwanted ambient noise within the dome to escape. A visually-reflective coating, in conjunction with the open cell structure, provides a textured surface that acts as a micro-baffle and suppresses cross-reflection of projected imagery.

DETAILED DESCRIPTION

A system for providing an enhanced immersive display environment includes a number of novel features designed to enhance the performance of an immersive dome over presently-known immersive dome environments. Projectors are mounted in a multi-tier tower, out of sight below a viewing platform positioned to provide optimal wrap-around viewing. The projection surface consists of open-cell foam that allows passage of behind-surface sound into the dome while allowing unwanted ambient noise within the dome to escape. A visually-reflective coating, in conjunction with the open cell structure, provides a textured surface that acts as a micro-baffle and suppresses cross-reflection of projected imagery.

Tiered Projector Array Beneath Viewing Platform

Furthermore, in order to minimize distortion and brightness variations, it is desirable to place the projectors equidistant from the dome surface. Thus, the optimum location for the projectors is as close to the center of the dome as possible. It is also desirable that a mounting arrangement for the projectors should accommodate multiple projectors kept out of view of the audience while completely illuminating the available display surface.

The system includes a projector and viewing arrangement that maximizes the area for observers while minimizing the visibility of projectors, ensures that no projectors or other structures are shadowed on or otherwise obstruct the view of the dome from the viewing platform and allows maximum, unobstructed illumination of the dome surface.

Figure 1:
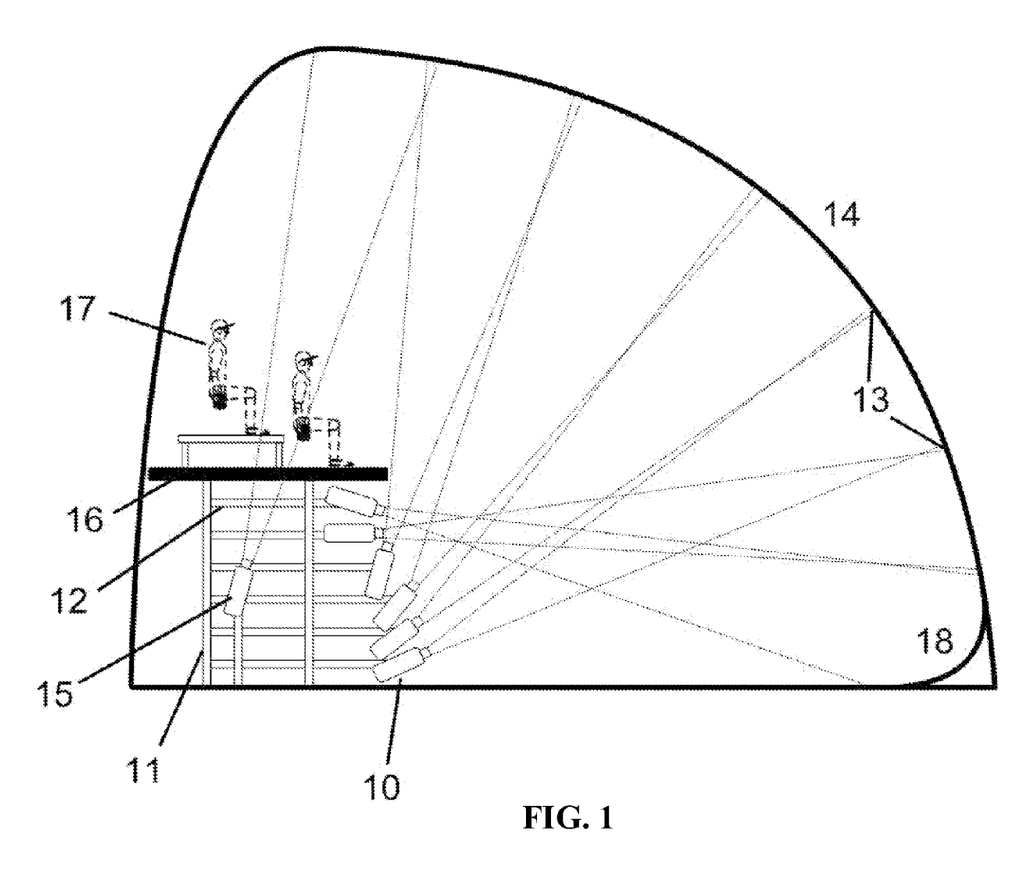
FIG. 1 depicts a side view of a system that includes an immersive dome, projector array and viewing platform.

FIG. 1 depicts a side view of a system that includes at least an immersive dome, projector array and viewing platform. In an embodiment, an array of projectors 10 is mounted in a tower 11; the base of the tower is at or slightly below the dome equator, and the tower axis is centered within the dome. The projectors are stacked in semi-circular or circular tiers 12, each of which projects onto an azimuthal band 13 of the dome 14. The number of projectors covering each band decreases as ascension increases and the diameter of the band narrows. The arrangement accommodates a large number of projectors for ultra-high resolution imagery. For projection at high ascension angles, e.g. the top of the dome, additional projectors 15 may be mounted on each side of the tower, outside of the viewer's desired visual field. The imagery from the multiple projectors is warped, blended, color corrected, and intensity matched to form a seamless display.

In an embodiment, a viewing platform 16 is mounted on top of the projector tower, placing viewers 17 above the equator of the dome to provide an optimum field of view. Because the projectors are below the platform floor, they are not visible and cannot be inadvertently blocked by movement of the viewers.

In an embodiment, a plurality of high-definition projectors is used to form an image on a partial dome 38 feet in diameter. In an embodiment, the high-definition projectors have a resolution of approximately 1920×1080 pixels. In an embodiment, the plurality of high-definition projectors numbers approximately 50 projectors. The partial dome spans an arc of approximately 210 degrees in azimuth and approximately 90 degrees in ascension.

In an embodiment, a fillet 18 at the equator of the dome transitions the curved dome to a strip of floor interior to the lower latitudinal terminus of the fillet to allow projection at ascensions beneath the equator. In an embodiment, the fillet has a tighter radius of curvature than the adjacent partial dome. This reduction in curvature combined with the strip of floor, results in a non-spherical region within the projection surface but reduces the amount of physical space required to extend the projection surface to ascensions further below the viewing platform, as well as lowering the required height of the platform.

In an embodiment, the displayed imagery is pre-distorted to offset the distortion that results from projecting onto the non-spherical regions, that is, the fillet and floor strip, of the projection surface. The non-spherical shape of the projection surface also demands a greater depth of field and thus, a smaller aperture in the projection optics than would be required in a perfectly spherical dome if image sharpness is to be maintained. The space savings described above must therefore be balanced against the resulting reduction in image sharpness and/or brightness. This tradeoff is mitigated, however, by the fact that the non-spherical regions of the projection surface are near the periphery of the visual field of a viewer positioned on the platform.

With regard to the projector arrangement, the dome is not limited to the shape described above, but may be within a range between purely spherical and aspherical.

Figure 2:
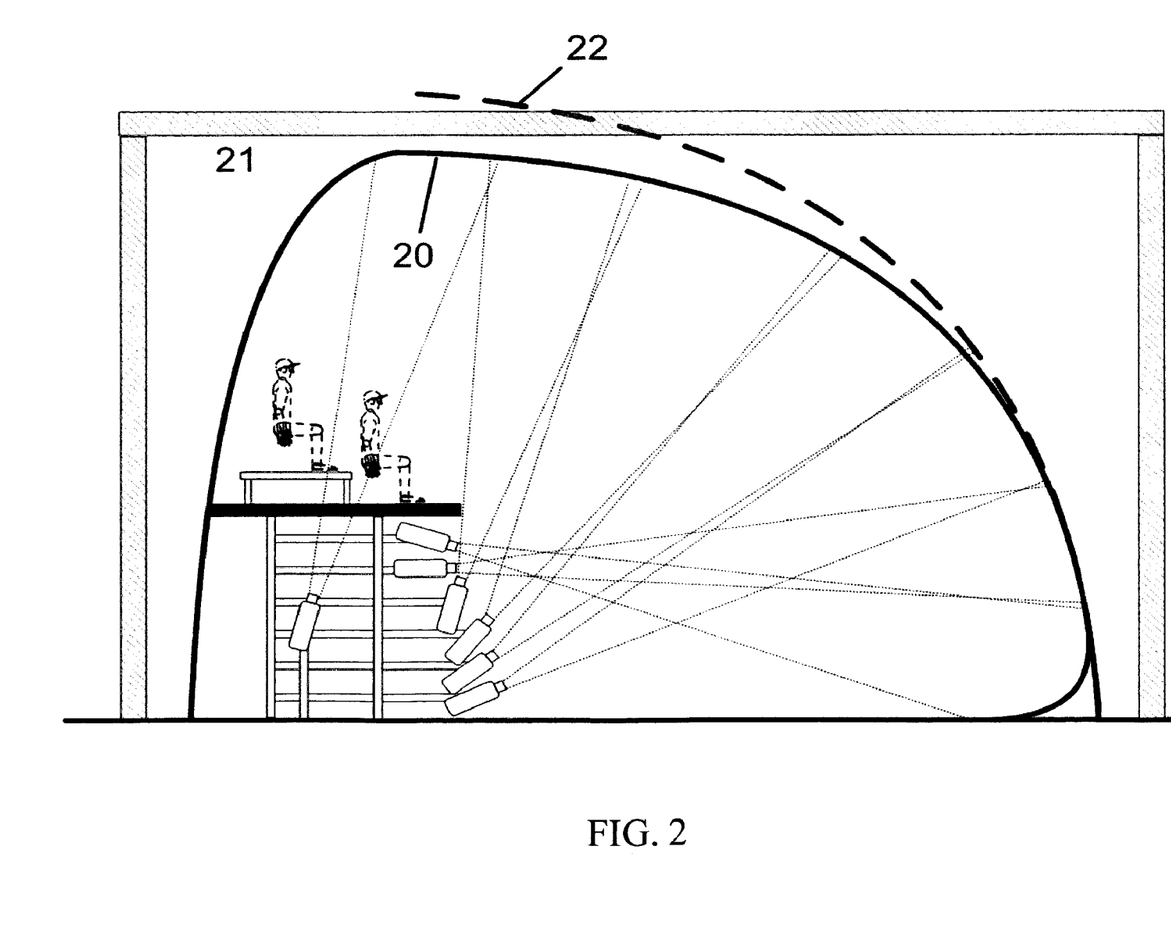
FIG. 2 depicts a dome flattened to lower the ceiling height in the system of FIG. 1.

For example, FIG. 2 depicts a dome flattened to lower the ceiling height. This may be done to accommodate the top of the dome 18 under a roof structure 19, where a constant radius dome 20 would not fit. The tradeoff is that further pre-distortion is required which results in reduced brightness and sharpness. Because intensity is matched among all projectors, the reduction in brightness and sharpness has the effect of lowering the brightness of the entire dome projection.

Figure 3:
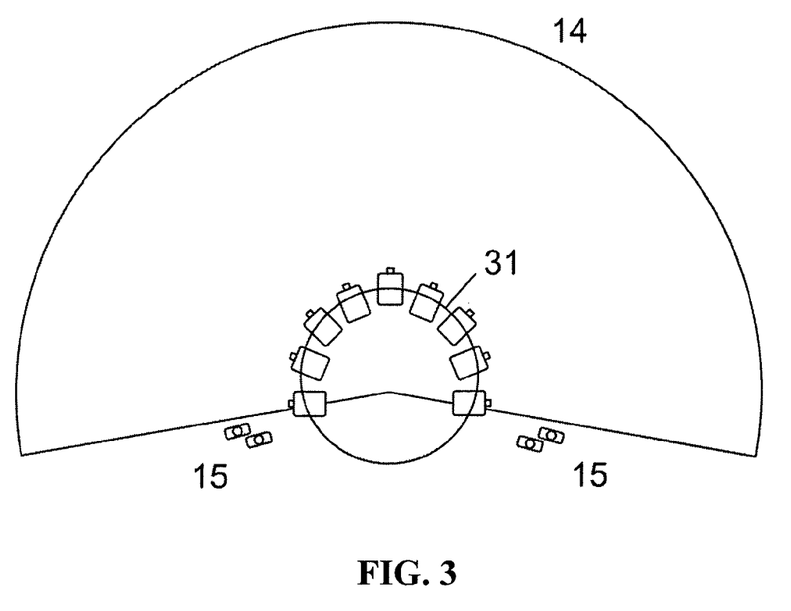
FIG. 3 depicts a top-view schematic of the projector array in the system of FIG. 1.

FIG. 3 depicts a top-view schematic of the projector arrangement. For clarity, one tier 30 is shown. As noted, the projectors are mounted in a tower below the viewing platform. Because the projectors are below the platform, they are not visible to viewers positioned there. However, the need to illuminate the top portion of the dome, directly over the viewing platform, dictates projectors to cover this area be mounted so as to protrude beyond the edge of the platform. Alternatively, these high-angle projectors may be placed in additional fixtures 15 apart from the projector tower, for example on either side of and behind the center of the tower, where they are not readily visible when viewing the surface of a partial dome.

Figure 4:
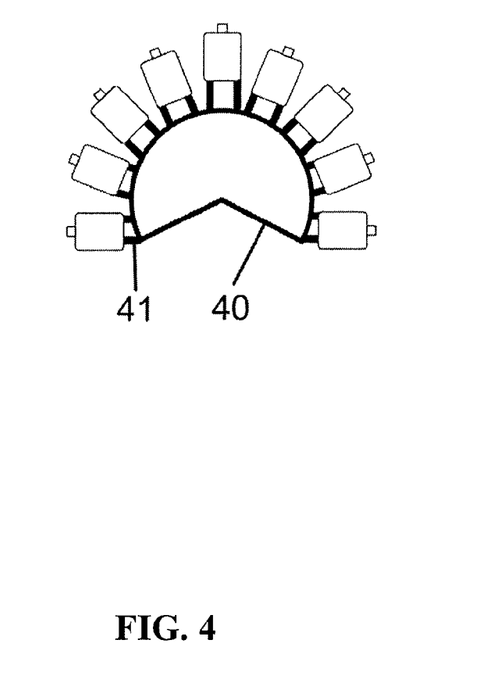
FIG. 4 depicts a top view of a single tier of the projector mounts in the projector array.
Figure 5:
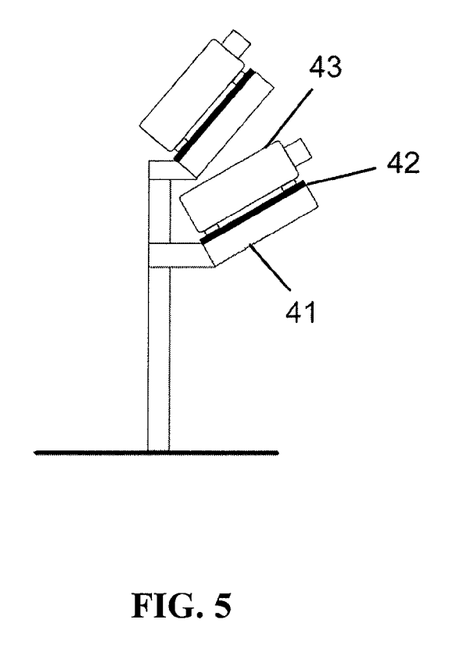
FIG. 5 depicts a side view of a single projector mount.

FIG. 4 depicts a top view of one tier of the projector mounts, while FIG. 5 depicts a side view of a single projector mount. In an embodiment, the tier framework 40 is composed of square section steel tubing, with two welded square section steel tubes forming arms 41 on which a rigid platform 42 is mounted. The projector 43 is affixed to this platform.

Figure 6:
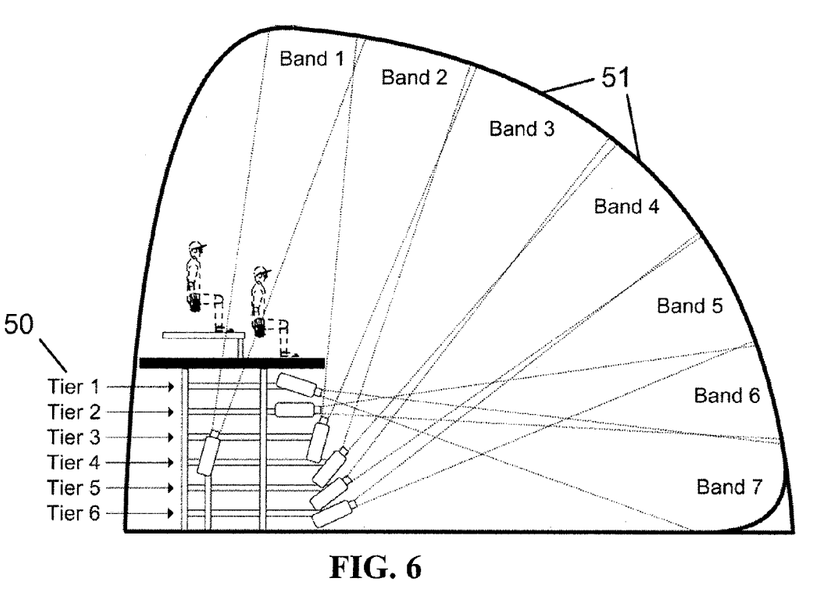
FIG. 6 depicts the relationship between the physical tiers of projectors and the corresponding azimuthal bands on the dome.

FIG. 6 depicts the relationship between the physical tiers of projectors and the corresponding azimuthal bands of the dome surface onto which each tier projects. In an embodiment, 46 projectors are stacked in 6 tiers in a tower centered at the base of the dome and two sets of 2 projectors are mounted at high angles on separate fixtures on either side of the tower. Each tier 50 of projectors covers a corresponding azimuthal band 51 of the dome, and the tiers of projectors are configured to provide consistent resolution, from the smaller diameter bands at the top of the dome to the larger diameter bands at the base of the dome.

The number of projectors is based on at least several factors. Among these are:
availability of relatively inexpensive standard high-definition (HD) projectors;
desired size of the dome (ideally about 20 feet from the viewer, following which stereo vision is less effective); and
sufficient illumination of the projected imagery at the dome distance.

For maximum detail, the number of pixels on the dome will ideally match or exceed the eye-limited resolution of about 1 arc-minute per line pair.

If the azimuthal bands are numbered from highest to lowest ascension and the projector tiers are numbered from the top of the projector tower to its base, the bands and tiers correspond as follows:

TABLE 1

| Azimuthal Band on Dome | Number of Projectors | Mounting Location |
| --- | --- | --- |
| 1 (top of dome) | 4 | side-mounted in two sets (not in tower) |
| 2 | 5 | Tier 3 |
| 3 | 7 | Tier 4 |
| 4 | 7 | Tier 5 |
| 5 | 9 | Tier 6 |
| 6 | 9 | Tier 2 |
| 7 (base of dome) | 9 | Tier 1 |

Therefore, the physical stacking of the tiers in the projector tower is as follows, from top to base:
Tier 1: 9 projectors (Band 7);
Tier 2: 9 projectors (Band 6);
Tier 3: 5 projectors (Band 2);

Tier 4: 7 projectors (Band 3);
Tier 5: 7 projectors (Band 4); and
Tier 6: 9 projectors (Band 5).

The viewing platform and projector tower are oriented in relation to each other such that the viewing platform is unobstructed by the projector tower and the projector tower does not obstruct the line of sight of a viewer on the viewing platform looking at any portion of the display surface. In an embodiment, the viewing platform is mounted on top of the projector tower and centered on the equatorial axis of the dome. For a viewer positioned at the forward edge of the platform, the display surface extends below the viewer's position and fills his/her peripheral vision with an azimuthal field of view of approximately 225 degrees—an increase over the 210 degree field of view at the center of the platform. It may be readily seen that, in an embodiment, a field of view of up to 360 degrees in azimuth is achieved by extending the projector tiers to complete circles.

Use of a large number of projectors enables eye-limiting resolution and high light output on a sizable dome using off-the-shelf high-definition projectors, even taking into account the percentage of overlap required for smooth blending of images. Although it is possible to abut warped images on a curved surface without overlap—commonly known as "hard seams"—this approach demands precise control of light levels and brightness, and the slightest deviation, misalignment or off-axis viewing will reveal the seams. It is more practical and robust to overlap images between projectors, with the degree of overlap ranging from a few percent to one-third or more, thus reducing the total number of pixels seen on the dome surface. Smoother blending, which may include any of matching geometry, color and intensity, is possible as the degree of overlap increases.

Warp correction may be achieved by projecting a grid or other test pattern from each projector, then using a camera to view the projected image to enable calculation of the pre-distortion required. The closer each projector is to the center of the dome, the more the lens axis is normal to the dome surface with consequently less warp required The geometry of the invention is advantageous in this regard as well, since the projectors are closely clustered about the geometric center of the dome.

Additionally, the resolution of the dome may be varied as desired. Fewer projectors can be used in each tier and/or the number of tiers reduced, trading off pixel count for wider fields of view. If more resolution is desired, projectors can be added by stacking additional tiers and/or increasing the diameter of each tier. The number of projectors may also be adjusted to suit the desired brightness or to adjust resolution to the size of the dome.

Acoustically Transparent, Micro-Baffled Projection Surface

A directionally accurate audio system is important for immersive environments, as directional cues and realistic sound effects synchronized with imagery enhance the visualization experience. The presence of a large projection surface wrapped around the viewer suggests placement of speakers behind the surface. In an embodiment, this is implemented by mounting multiple speakers behind the projection surface. Thus, the system includes an immersive dome having an acoustically-transparent projection surface to reduce unwanted acoustic reflection. At the same time, high reflectivity of the inner surface is preserved to maintain image brightness, while cross-reflectance from adjacent projected imagery is suppressed. To preserve the realism of the imagery and to cue the viewer to look at a particular region, the directionality of the audio source is preserved.

Figure 7:
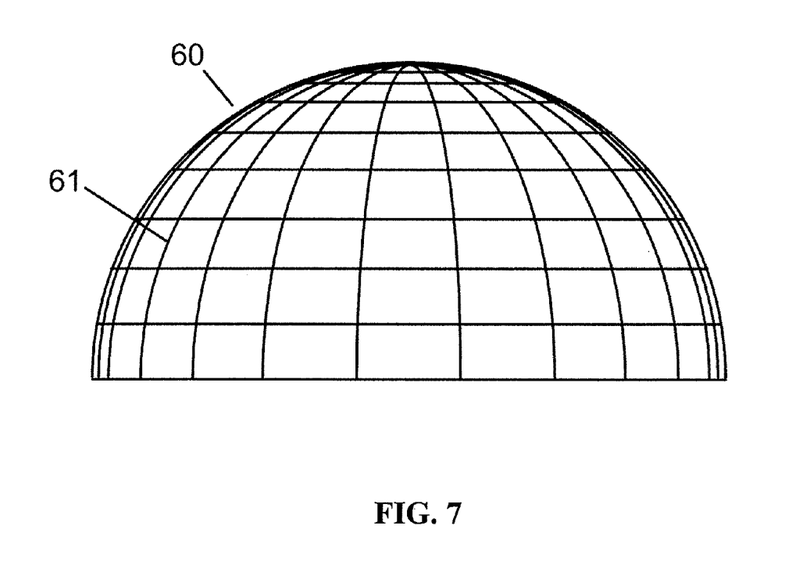
FIG. 7 depicts the framework of the immersive dome of FIG. 1.

FIG. 7 depicts the framework of the immersive dome of FIG. 1, onto which the projection surface is mounted. The framework consists of closely spaced members 61, in one embodiment steel frames, for adequate support of the display surface.

Figure 8:
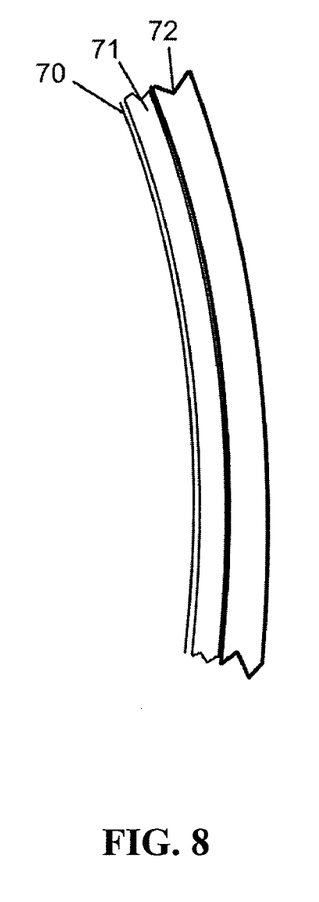
FIG. 8 depicts a cross-section of the surface of the immersive dome of FIG. 1.

FIG. 8 depicts a cross-section of the dome surface. This projection surface comprises a layer of a reflective material 70 over open cell foam 71, affixed to a framing support 72. In one embodiment, the foam is affixed to hook and loop strips of the very high bond variety, which are in turn glued to the metal dome framework using foam and fabric adhesive. This adhesive may also be used to glue seams of foam material together. In another embodiment, a metal mesh between the dome framing members gives support and adhesion over the entirety of the dome surface. The foam is of sufficient thickness and rigidity to maintain the desired curvature between framing supports. In one embodiment, the foam used is polyurethane having an approximate thickness of 1" and an approximate density of 1.3-1.4 lbs per square foot. In another embodiment, a dense, flame-resistant open-cell foam such as PYRELL (REILLY FOAM CORP., Conshohocken, Pa.) is used, with a density of 4 lbs. per square foot. In an embodiment, the projection surface comprises a layer of open-cell foam without a reflective layer.

The open cell foam used is at least partially acoustically transparent at low frequencies and absorptive at high frequencies. Speakers may be placed anywhere outside the dome for optimum directional sound between the dome surface and sound-absorptive materials in the surrounding structure. Sound from the behind-surface speakers is accordingly boosted or pre-emphasized at high frequencies to compensate for the resulting attenuation. By either absorbing or passing all sounds that emerge from the dome, the open cell foam prevents the undesirable reflection of sounds (from speakers or the audience) back to the audience. Additional sound-absorbing material is positioned outside of the dome to prevent low frequency sound emanating from within the dome from reflecting back into the dome from any surrounding structure.

In an embodiment, a visually reflective layer is applied to the inner surface of the open cell foam to provide a projection surface. Any of several types of coatings can be used, such as aluminum-based, glass bead, acrylic, or specialized screen paint. The paint color can range from white to neutral-density gray, optimized as desired for contrast, projector intensity, pixel density, background darkness, light levels, and human eye response. The coating also imparts a degree of rigidity, enabling the foam to better maintain its shape between the supports and also hides seams between foam blocks.

Figure 9:
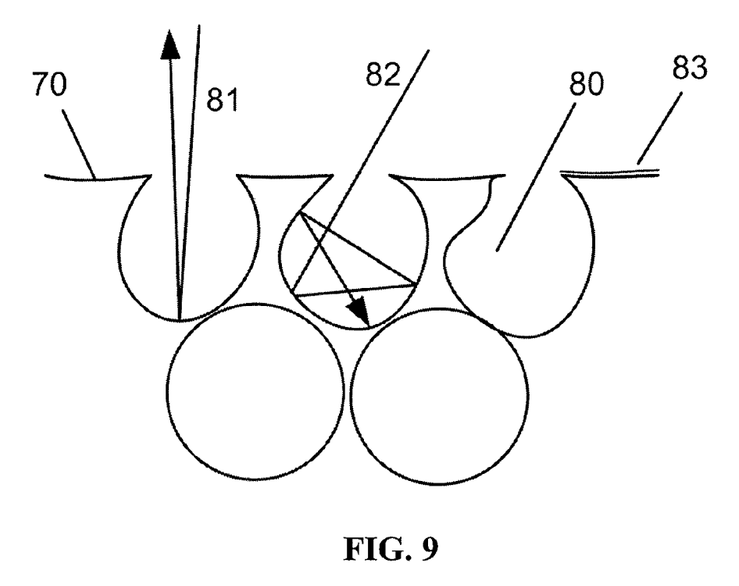
FIG. 9 depicts cross-reflectance suppression in an open cell foam structure.

FIG. 9 depicts cross-reflectance suppression in the open cell foam structure. The reflective coating 70 is applied thinly enough so as not to fill or block the open cell foam structure 80. Specifically, the reflective paint coats the inside of the open cells. This yields a projection surface that reflects most light at near-normal incidence angles 81. Conversely, light approaching from more oblique incidence angles 82 is trapped in the open cell, thus reducing cross-reflectance. The result of the coating is thus a micro-baffled surface with an anisotropic (non-Lambertian) surface luminance with relatively high reflectivity at near-normal incidence, and relatively low (or near zero) reflectivity at more oblique incidence.

The coating may be applied in multiple layers, each layer having unique functional characteristics; for example, a reflective coating may first be applied to coat the open cell cavities, followed by an absorptive layer 83 to suppress cross-reflectance, lightly applied to the foam surface so as not to obstruct the cavities. In certain embodiments, the reverse may also be desirable.

Figure 10:
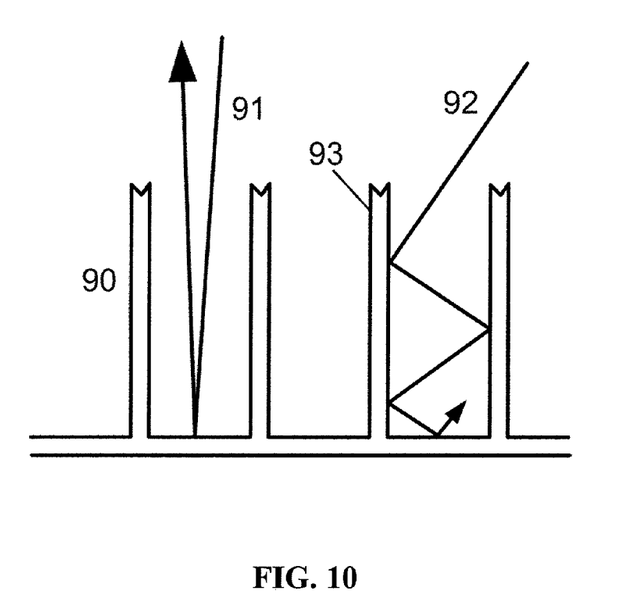
FIG. 10 depicts an engineered surface for suppressing cross-reflectance.

In other embodiments, the projection surface constitutes an engineered surface having, for example, a machined or foamed texture that acts as a micro-baffle. FIG. 10 depicts an engineered surface 90 for suppressing cross-reflectance. Light at near-normal incidences 91 is reflected, whereas light at oblique angles 92 is trapped and dissipated in the vertical cavities 93, of which the vertical walls may be lined with a non-reflective or light-absorbent material.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A projection structure for an immersive dome having an interior defined therein, comprising:
    at least one portion of an open-cell foam layer comprising an inner surface for displaying at least one visual image projected thereon, and an outer surface opposite said inner surface; and
    a plurality of cells that extend through said open-cell foam layer, wherein said plurality of said cells are open to other of said cells to form interconnected paths therebetween, wherein a first portion of said cells extends into said open-cell foam layer from said inner surface, wherein a second portion of said cells extends into said open-cell foam layer from said outer surface, and wherein a portion of said interconnected paths extends between said inner surface and said outer surface between interconnected cells;
    wherein said open-cell foam layer is at least partially acoustically transparent for permitting desired sound transmission through said interconnected paths that extend between said inner surface and said outer surface between said interconnected cells, while reducing unwanted sound reflection.

2. The projection structure of claim 1, wherein said at least one portion of open-cell foam comprises at least one sheet of open-cell foam.

3. The projection structure of claim 1, wherein said at least one portion of open-cell foam is affixed to and supported by framing members.

4. The projection structure of claim 1, further comprising:
    a visually reflective layer applied to said inner surface that receives said at least one projected visual image.

5. The projection structure of claim 4, wherein said visually reflective layer comprises at least one of:
    an aluminum-based coating, a glass bead coating, an acrylic coating, or a reflective screen coating.

6. The projection structure of claim 5, wherein said visually reflective layer forms a micro-baffled surface having an anisotropic surface luminance with high reflectivity at near-normal incidence, and near zero reflectivity at more oblique incidence.

7. The projection structure of claim 1, wherein said at least one portion of open-cell foam comprises polyurethane.

8. The projection structure of claim 4, wherein said visually reflective layer imparts additional rigidity to said inner surface.

9. The projection structure of claim 4, wherein said visually reflective layer coats the inside of the open cells of said inner surface, permitting reflectance of light at a near-normal angle to said inner surface, while suppressing reflectance of off-normal light.

10. The projection structure of claim 4, further comprising at least one layer of visually absorptive material applied to said visually reflective layer to suppress cross-reflectance.

11. A structure for display of an image, comprising:
    an object having a first surface; and
    a plurality of cavities defining vertical walls that extend into said object from said first surface;
    wherein said plurality of cavities terminate before extending through said object, and wherein said plurality of cavities form a micro-baffle; and
    wherein light at near normal incidence is reflected and wherein light at oblique angles of incidence is trapped and absorbed by said cavities for suppressing visible cross-reflectance.

12. The structure of claim 11, wherein said vertical walls of said cavities are lined with a non-reflective layer.

13. A method, comprising the steps of:
    providing a structure comprising
        at least one portion of an open-cell foam layer comprising a first surface and a second surface opposite said first surface, and
        a plurality of cells that extend through said open-cell foam layer, wherein said plurality of said cells are open to other of said cells to form interconnected paths therebetween, wherein a first portion of said cells extends into said open-cell foam layer from said first surface, wherein a second portion of said cells extends into said open-cell foam layer from said second surface, and wherein a portion of said interconnected paths extends between said first surface and said second surface between interconnected cells; and
    projecting at least one visual image upon said first surface for display of said at least one projected visual image;
    wherein said open-cell foam layer is at least partially acoustically transparent for permitting desired sound transmission through said interconnected paths that extend between said first surface and said second surface between said interconnected cells while reducing unwanted sound reflection.

14. The method of claim 13, wherein said at least one portion of open-cell foam comprises at least one sheet of open-cell foam.

15. The method of claim 13, further comprising the step of:
    affixing said at least one portion of open-cell foam to at least one framing member for structural support, wherein said at least one portion of open-cell foam affixed to said at least one framing member comprises an immersive dome having an interior defined therein for display of visual images.

16. The method of claim 15, further comprising the step of:
    applying a visually reflective layer to said first surface of said at least one portion of open-cell foam that faces toward said interior of said immersive dome.

17. The method of claim 13, wherein said at least one portion of open-cell foam comprises polyurethane.

18. The method of claim 16, wherein said visually reflective layer comprises at least one of:
    an aluminum-based coating, a glass bead coating, an acrylic coating, or a reflective screen coating.

19. The method of claim 16, wherein said visually reflective layer forms a micro-baffled surface having an anisotropic surface luminance with high reflectivity at near-normal incidence, and near zero reflectivity at more oblique incidence.

20. The method of claim 16, wherein said visually reflective layer coats the inside of said open cells of said first surface, permitting reflectance of light at a near-normal angle to said first surface, while suppressing reflectance of off-normal light.

21. The method of claim 16, further comprising the step of: applying a layer of visually absorptive material over said visually reflective layer to suppress cross-reflectance.

* * * * *